J. F. COOPER & W. W. HIATT.
Hog-Trap.
No. 160,307.  Patented March 2, 1875.
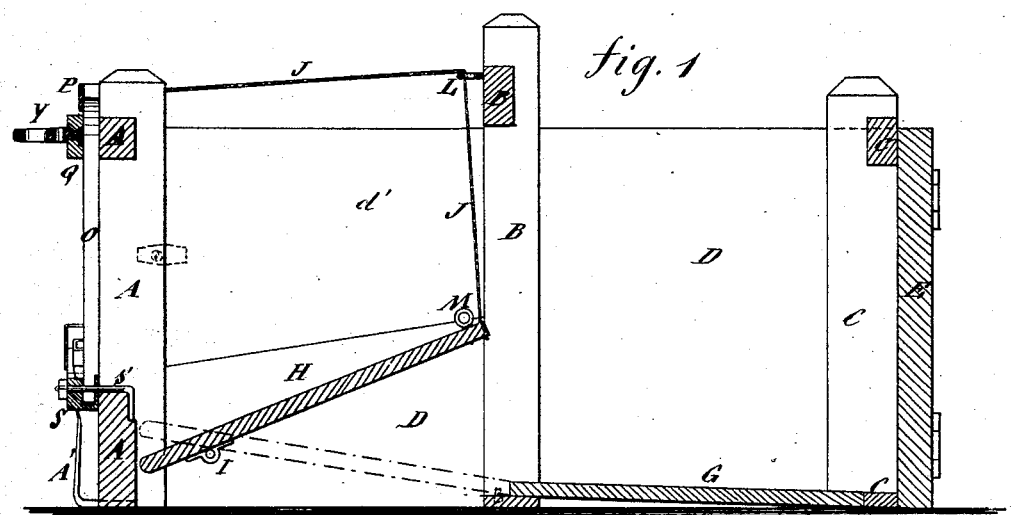
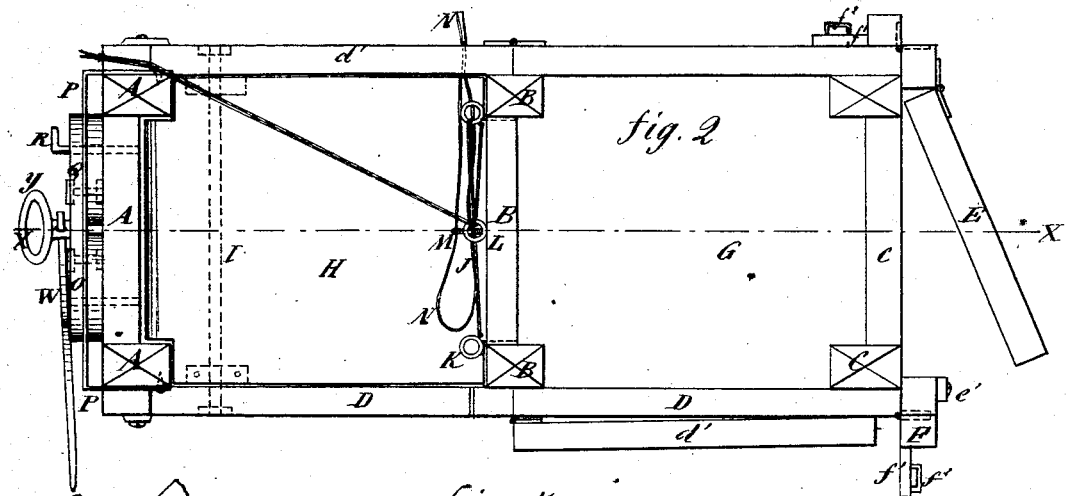
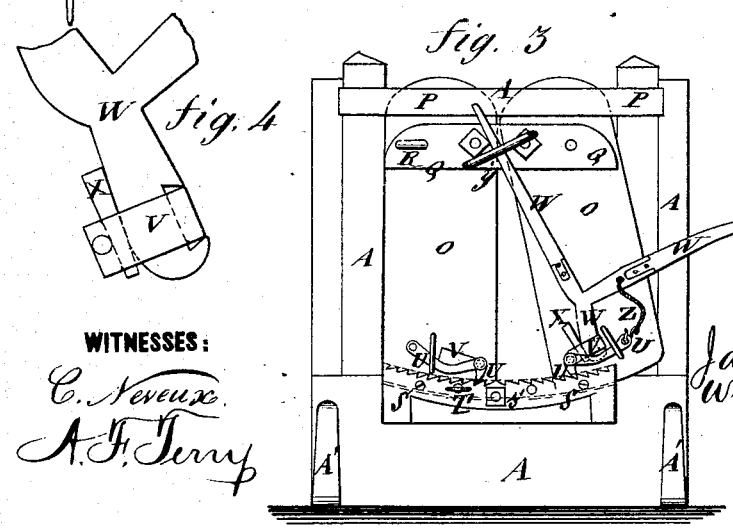
WITNESSES:
C. Neveux
A. F. Terry
INVENTOR:
James F. Cooper
William W. Hiatt
BY
ATTORNEYS

UNITED STATES PATENT OFFICE.

JAMES F. COOPER AND WILLIAM W. HIATT, OF FRANKTON, INDIANA.

IMPROVEMENT IN HOG-TRAPS.

Specification forming part of Letters Patent No. 160,307, dated March 2, 1875; application filed October 24, 1874.

*To all whom it may concern:*

Be it known that we, JAMES F. COOPER and WILLIAM W. HIATT, of Frankton, in the county of Madison and State of Indiana, have invented a new and useful Improvement in Hog-Trap, of which the following is a specification:

Figure 1 is a vertical longitudinal section of our improved hog-trap, taken through the line $x\ x$, Fig. 2. Fig. 2 is a top view of the same. Fig. 3 is a front-end view of the same. Fig. 4 is a detail view of the three-armed lever.

Similar letters of reference indicate corresponding parts.

Our invention has for its object to furnish an improved trap for catching and holding hogs while ringing, marking, castrating, or spaying them, or performing any other desired operation upon them, and which shall be simple in construction and convenient in use, holding the hogs securely and in such a way that they cannot injure themselves.

The invention consists in the combination of the hinged racks with the sides of the rear end of the hog-trap; in the arrangement of the two boards, their connecting cross-bar, and the stationary supporting cross-bars with respect to each other and the front frame, to enable the lower end of either of said boards to be swung outward and the upper ends of said boards to be turned down to either side; and in the combination of the three-armed lever, the keepers, the key, the lever-pawls, the cord or chain, and the screw-loop with the two boards, the ratchet-bar, and the top cross-bar, as hereinafter fully described.

A, B, and C are three rectangular frames, placed at the front end, the center, and the rear end of the trap, and to the posts of which the side boards D are attached. The rear end of the trap is closed with a door, E, hinged to a strip attached to the ends of the boards D, at one side, or to the post of the frame C, and secured, when closed, by a button, $e'$, pivoted to a similar strip at the other side of the said trap. To the outer sides of the rear end of the trap are hinged posts F, to which are attached short horizontal strips $f^1$, which are provided near their ends with a bar, $f^2$, inserted in keepers attached to the upper and lower bars. The racks F $f^1 f^2$ are designed to receive the ends of rails to form a yard or pen to confine the hogs at the rear end of the trap, and which, when not in use, can be swung back against the sides of the trap. The detachable bars $f^2$ enable the rails to be conveniently inserted and removed, when required. In the upper front part of the sides D are formed doors $d'$ to give the operator free access to the hogs when secured to the table from either side of the trap. The floor of the trap is made in two parts, G H, the rear part G of which is stationary and is secured in place with a slight inclination to the rearward. The front part H is hinged, near its forward end, to a rod or long bolt, I, upon which it rests, and the ends of which are secured to the lower forward parts of the sides D. The part H, when lowered, is about in line with the stationary part G. To the rear end of the forward part H are attached cords J, which pass up along the posts of the frame B, through guide eyes or pulleys K attached to the upper corners of the frame B, through a guide eye or pulley, L, attached to the center of the top bar of the frame B. The cords J pass together from the guide eye or pulley L to one or the other of the forward corners of the trap, and are inserted in slits or notches in the upper ends of strips attached to the frame A or in the upper ends of the posts of said frame A. Several knots are formed in the end parts of the cords J, so that, by adjusting them in their slits, the rear end of the table H may be readily adjusted into and supported in any desired position. To the center of the upper side of the rear end of the table H is attached a guide-eye, M, through which is passed a looped cord, N, which is designed to be put around the hog's hind legs, and the ends of which are inserted in a slit in the upper edge of the sides D, beneath the doors $d'$, several knots being formed upon said ends to enable the cord to be conveniently adjusted at any desired tension. The front end of the trap is closed by two boards, O, the upper ends of which are supported against outward pressure by an iron bar, P, the ends of which are bent inward, and are secured to the upper ends of the posts of the frame A. The upper ends of the boards O are rounded off and are connected by a cross-bar, Q, to which they are pivoted, near their inner edges, by bolts which pass through the said cross-bar and boards, so that the lower end of either of the boards O may be swung outward without disturbing the other board. The upper end of the board O that is to remain stationary is secured in place by a detachable pin, R, which passes through a hole formed through the cross-bar Q, the board O, and the top bar of the frame A. The lower ends of the boards O are supported against outward pressure by the bar S, into a groove in the upper side of which said ends enter, and which is pivoted at its middle part to the frame A by a bolt, s, as shown in Figs. 1 and 3, so as to allow the upper ends of both the boards O to be swung outward to either side, as may be required, without removing their lower ends from the groove of the bar S. The lower end of the one of the boards O that is not to be swung outward is secured in place by a bolt or hand-screw, T, which passes through the bar S and into the board O. Upon the upper side of the bar S are formed ratchet-teeth, with which the lever-pawls U engage. The lever-pawls U are pivoted to lugs formed upon the inner ends of the keepers V, which are secured to the boards O a little above the bar S. W is a three-armed lever, the lower arm of which is inserted in one of the keepers V, and is notched to receive the end of the said keeper, when it is secured in place by a wedge or key, X, driven into the other end of the said keeper V, along the edge of the said arm. The upper and side arms of the lever W are extended by having wooden bars attached to them. The upper end of the upper arm of the lever W enters a hole in the shank of the hand-loop Y, which is screwed into the center of the cross-bar Q and serves as a fulcrum to the lever and as a handle for turning the boards O down and up, as required. The side arm of the three-armed lever W serves as a handle for swinging the lower end of the board O, with the keeper of which its lower arm is connected, out and in, as required. To the inner part of the side arm of the lever W is attached the end of a short cord or chain, Z, the other end of which is provided with a hook to hook into a hole in the end of the lever-pawl U, to enable said pawl to be conveniently raised when the lower end of the board O is to be swung outward, the said pawl slipping over the ratchet-teeth when the end of the board O is moved inward.

In using the trap one or more of the hogs is driven into it, and the door E is closed. The lower end of one of the boards O is swung outward sufficiently to allow one of the hogs to put his head through the opening in seeking to escape, and the lower end of said board is then pushed inward so far as to prevent him from withdrawing his head.

When the hog is to be castrated or spayed the rear end of the table H is raised, and the hog is thrown upon his side by turning the boards O down upon one or the other side by placing the hand-screw T in the proper board and withdrawing the pin R, according as may be most convenient in view of the operation to be performed. The boards O are supported against outward pressure when turned down by dropping into an open keeper or hook, A', attached to the lower corner of the frame A.

Having thus described our invention, what we claim as new, and desire to secure by Letters Patent, is—

1. The combination of the hinged racks F $f^1 f^2$ with the sides of the rear end of the hog-trap, substantially as herein shown and described.

2. The arrangement of the two boards O, the cross-bar Q, and the stationary bars P and S, with respect to each other and the frame A, substantially as herein shown and described.

3. The combination of the three-armed lever W, the keepers V, key X, lever-pawls U, cord or chain Z, and screw-loop Y with the boards O, the ratchet-bar S, and the cross-bar Q, substantially as herein shown and described.

JAMES F. COOPER.
WILLIAM W. HIATT.

Witnesses:
  JESSE LITTLE,
  B. F. DAVIS.